United States Patent [19]

Kimura et al.

[11] Patent Number: 5,607,775
[45] Date of Patent: Mar. 4, 1997

[54] ARTICLE FOR USE UNDER HIGH VACUUM AT HIGH TEMPERATURE

[75] Inventors: Noboru Kimura; Ryouji Iwai; Kazuhito Hirata, all of Gunma-ken, Japan

[73] Assignee: Shin-Etsu Chemical Co., Ltd., Tokyo, Japan

[21] Appl. No.: 558,799

[22] Filed: Nov. 15, 1995

[30]     Foreign Application Priority Data

Nov. 15, 1994   [JP]   Japan ................................. 6-280266

[51] Int. Cl.⁶ ...................................................... G04B 35/58
[52] U.S. Cl. ........................... 428/461; 428/336; 428/457; 428/698; 428/704; 501/96; 501/98
[58] Field of Search ........................................ 428/336, 461, 428/457, 698, 704; 501/96, 98; 423/284

[56]              References Cited

U.S. PATENT DOCUMENTS 4,634,640   1/1987   Hunold et al. .......................... 428/698
4,960,734  10/1990   Kanai et al. ............................ 501/98
4,977,103  12/1990   Chand ..................................... 437/105
5,332,629   7/1994   Sumiya et al. .......................... 501/96

FOREIGN PATENT DOCUMENTS 0039774  11/1981   European Pat. Off. .

*Primary Examiner*—Archene Turner
*Attorney, Agent, or Firm*—Wenderoth, Lind & Ponack

[57]              ABSTRACT

Proposed is an article of pyrolytic boron nitride such as crucibles for use at a high temperature under an extremely high vacuum as in the molecular beam epitaxy. The article can be used in the high temperature, high vacuum process without the conventional elaborate and time-consuming degassing bake-out treatment because the article is wrapped in a wrapping film having a specified low moisture permeability immediately after a preliminary degassing treatment under specified conditions before the article is wrapped under a low-moisture atmosphere in a glove box.

5 Claims, No Drawings

ARTICLE FOR USE UNDER HIGH VACUUM AT HIGH TEMPERATURE

BACKGROUND OF THE INVENTION

The present invention relates to an article for use under high vacuum at high temperatures or, more particularly, to an article, such as a crucible for the molecular-beam epitaxy cell, made, for example, from pyrolyric boron nitride and to be used under high vacuum at high temperatures, which is ready for service.

Articles, such as a crucible for use as a molecular-beam epitaxy cell, are usually made from pyrolytic boron nitride, referred to as PBN hereinafter, and the PBN crucible is set on a source cell for the molecular beam which is mounted on a so-called K-cell of a molecular-beam crystal growing apparatus. The crucible is charged with a source material of molecular beams, such as gallium, aluminum, arsenic, silicon and the like, and heated in an atmosphere of an extremely high vacuum to generate a molecular beam by the evaporation of the source material while the molecular beam targetted at the surface of a substrate wafer of, for example, a semiconductor silicon or germanium or a compound semiconductor such as gallium arsenide, indium phosphide and the like to grow an epitaxial layer thereon. It is essential in this process of epitaxy that the atmosphere inside the molecular-beam crystal growing chamber is under an extremely high and stable vacuum of $10^{-10}$ to $10^{-11}$ Torr.

It is known that degradation in the quality or purity of the epitaxial layer formed by the molecular-beam method is caused by the gaseous emission from the PBN crucible and other articles in the chamber because the process is performed at a high temperature under an extremely high vacuum mentioned above so that even a trace volume of the gaseous emission causes a great increase and fluctuation in the vacuum pressure to seriously affect the quality of the epitaxial layer even by setting aside the problem of an increased load on the vacuum pumps to maintain the high vacuum.

Accordingly, it is an established practice that the PBN crucible before charging with the epitaxial source material is set on the K-cell and subjected to a bake-out treatment at a high temperature under a high vacuum to effect degassing. A problem in this degassing bake-out treatment is that degassing can hardly be complete unless the treatment is performed for a considerably long time. When the bake-out treatment is performed at a high temperature of 1000° C. to 1500° C. under a high vacuum of $10^{-6}$ to $10^{-9}$ Torr, for example, complete degassing of a PBN crucible set on the K-cell and other articles can be accomplished only after continuing the bake-out treatment for 4 days to 9 days consequently to greatly decrease the working efficiency of the instruments resulting in a great increase in the production costs of the epitaxial products.

SUMMARY OF THE INVENTION

The present invention accordingly has an object to provide an article such as crucibles and others made, in particular, from PBN ready for use at a high temperature under a high vacuum which can be used without undertaking the above mentioned elaborate and time-consuming degassing bake-out treatment.

Thus, the article of the invention for use at a high temperature under a high vacuum which is an article made from PBN after being subjected to a bake-out treatment at a temperature of 600° C. or higher or, preferably, 800° C. or higher for at least 1 hour in a vacuum atmosphere having a pressure of 1 Torr or lower or, preferably, $1\times10^{-3}$ Torr or lower and wrapped in an atmosphere of an inert gas having a relative humidity not exceeding 10% with a wrapping film having a low moisture permeability not exceeding, for example, 10 g/m²·24 hours.

DETAILED DESCRIPTION OF THE PREFERRED EMBODIMENTS

Crucibles and other articles of PBN are prepared by the so-called LPCVD method from a boron halide and ammonia as the reactant gases and cannot be free more or less from occlusion of various gases which are unavoidably emitted when the crucible is heated at a high temperature under an atmosphere of high vacuum as in the epitaxial chamber. The gaseous species emitted from a PBN crucible under such conditions have not yet been identified in detail but presumably include a trace volume of moisture held on the PBN crucible by adsorption, boron oxide and nitrogen produced from boron nitride by thermal decomposition each having a considerably high vapor pressure at the temperature.

The articles as the subject material of the present invention include not only various vessels such as crucibles of PBN for use in the molecular-beam epitaxy and boats for use in the vapor deposition of a metal such as aluminum but also shutters, reflectors, pipes and tubes as well as ceramic heaters used at high temperatures under high vacuum.

The vacuum pressure of the atmosphere under which the degassing bake-out treatment of the article is undertaken according to the invention should be 10 Torr or lower or, preferably, $10^{-3}$ Torr or lower or, more preferably, $10^{-6}$ Torr or lower or, most preferably, $10^{-8}$ Torr or lower. When the pressure of vacuum is too high, the degassing treatment can be complete only after an unduly long time to cause an economical disadvantage.

The temperature for the degassing treatment should be 400° C. or higher or, preferably, 800° C. or higher or, more preferably, 1000° C. or higher or, most preferably, 1300° C. or higher but should not exceed 1600° C. When the degassing temperature is too low, oxide impurities having a relatively high boiling point cannot be completely removed while, when the degassing temperature is too high, thermal decomposition of PBN is increased resulting in an increase in the emission of nitrogen gas.

The time taken for the degassing treatment naturally depends on the degassing temperature and degree of vacuum and should be extended when the temperature is low and the pressure of vacuum is high. As a rough measure, the degassing treatment is conducted for at least 1 hour or, preferably, for 6 to 8 hours.

The PBN article after the above described degassing treatment is taken out of the degassing chamber and immediately transferred into a glove box filled with an inert gas such as nitrogen, argon, helium and the like, though not particularly limitative thereto. The relative humidity of the inert gas filling the glove box should be 10% or lower or, preferably, 1% or lower or, more preferably, 0.1% or lower at room temperature. When the relative humidity of the atmosphere of an inert gas is too high, a decrease is caused in the purity of the epitaxial layer formed by using the PBN article in the subsequent molecular-beam epitaxy.

The PBN article after the degassing treatment and transferred into the inert gas atmosphere in a glove box is then wrapped therein with a wrapping film having a limited moisture permeability which should be 10 g/m²·24 hours or lower or, preferably, 5 g/m²·24 hours or lower or, more preferably, 1 g/m²·24 hours or lower. Examples of suitable wrapping films include films of a synthetic plastic resin such as polyolefins, e.g. polyethylene and polypropylene, polyamides, polyesters and the like having, on at least one surface, a vapor-deposited coating layer of a metal such as aluminum. The wrapping film of a plastic having a vapor-deposited coating layer of aluminum should have a thickness of at least 3 μm or, preferably, at least 7 μm. The above mentioned low moisture permeability can hardly be obtained when the film thickness is too small.

In the following, examples and comparative examples are given to more fully describe the present invention.

EXAMPLE 1

A CVD reaction was performed from boron trichloride and ammonia to prepare a PBN crucible for use in the molecular-beam epitaxy, which had an outer diameter of 20 mm, depth of 140 mm and wall thickness of 1.0 mm. The crucible was subjected to an acid treatment by using aqua regia followed by thorough rinse with deionized water and drying at 120° C. The crucible was then put into a vacuum furnace which was evacuated to have a pressure of $10^{-8}$ Torr by means of a vacuum pump system and the temperature of the furnace was increased to 1300° C. to keep the crucible at this temperature for 8 hours followed by cooling to room temperature without breaking the vacuum and flushing of the furnace with dry nitrogen gas.

Thereafter, the crucible was taken out of the vacuum furnace and immediately transferred into a glove box filled with dry nitrogen having a relative humidity of 1.0% at room temperature and enveloped therein with a plastic bag made from a 7 μm thick polypropylene film provided with a vapor-deposited aluminum layer to have a moisture permeability of 0.5 g/m²·24 hours, which was hermetically sealed by welding.

After standing as such for one month at room temperature, the PBN crucible taken out of the plastic bag was used for the molecular beam epitaxy without undertaking the conventional degassing bake-out treatment. Namely, the crucible was charged with high-purity aluminum, arsenic or gallium and, immediately after establishment of a stationary state of the molecular beam, a HEMT (high electron mobility transistor) epitaxial film of aluminum, arsenic or gallium was deposited onto the surface of a gallium arsenide substrate at 600° C. under a high vacuum of $1\times10^{-11}$ Torr. No gaseous emission was noted in the epitaxy chamber during the process with a fully stable vacuum pressure and the quality of the thus obtained epitaxial layer was quite satisfactory.

COMPARATIVE EXAMPLE 1

The experimental procedure was substantially the same as in Example 1 except that the plastic bag was made from a polypropylene film of the same thickness but without the vapor-deposited aluminum layer to have a moisture permeability of 22 g/m²·24 hours. It was found that the vacuum pressure during the molecular beam epitaxy was unstable presumably due to gas emission from the crucible and the quality of the epitaxial layer thus obtained was inferior as compared with that obtained in Example 1.

COMPARATIVE EXAMPLE 2

The experimental procedure was substantially the same as in Example 1 except that the nitrogen gas filling the glove box for the wrapping work of the degasseal PBN crucible had a relative humidity of 20% at room temperature. It was found that the vacuum pressure during the molecular beam epitaxy was unstable presumably due to gas emission from the crucible and the quality of the epitaxial layer thus obtained was inferior as compared with that obtained in Example 1.

COMPARATIVE EXAMPLE 3

The experimental procedure was substantially the same as in Example 1 except that the degassing treatment of the PBN crucible at 1300° C. was performed for only 10 minutes instead of 8 hours. It was found that the vacuum pressure during the molecular beam epitaxy was unstable presumably due to gas emission from the crucible and the quality of the epitaxial layer thus obtained was inferior as compared with that obtained in Example 1.

COMPARATIVE EXAMPLE 4

The experimental procedure was substantially the same as in Example 1 except that the degassing treatment of the PBN crucible was performed at 500° C. instead of 1300° C. It was found that the vacuum pressure during the molecular beam epitaxy was unstable presumably due to gas emission from the crucible and the quality of the epitaxial layer thus obtained was inferior as compared with that obtained in Example 1

COMPARATIVE EXAMPLE 5

The experimental procedure was substantially the same as in Example 1 except that the degassing treatment of the PBN crucible at 1300° C. was performed in an atmosphere of nitrogen gas under normal pressure. It was found that the vacuum pressure during the molecular beam epitaxy was unstable presumably due to gas emission from the crucible and the quality of the epitaxial layer thus obtained was inferior as compared with that obtained in Example 1.

What is claimed is:

1. An article for use at a high temperature under a high vacuum which is an article made from PBN having been subjected to a degassing treatment at a temperature of 600° C. or higher for at least 1 hour in a vacuum atmosphere having a pressure of 1 Torr or lower and wrapped in an atmosphere of an inert gas having a relative humidity not exceeding 10% at room temperature with a wrapping film having a low moisture permeability not exceeding 10 g/m²·24 hours.

2. The article for use at a high temperature under a high vacuum as claimed in claim 1 in which the wrapping film is a film of a polyolefin having a vapor-deposited coating layer of aluminum on one surface.

3. The article for use at a high temperature under a high vacuum as claimed in claim 2 in which the wrapping film of a polyolefin has a thickness of at least 7 μm.

4. The article for use at a high temperature under a high vacuum as claimed in claim 1 in which the degassing treatment is performed at a temperature of 800° C. or higher.

5. The article for use at a high temperature under a high vacuum as claimed in claim 1 in which the degassing treatment is performed in a vacuum atmosphere having a pressure of $1\times10^{-3}$ Torr or lower.

* * * * *